(12) United States Patent
Park et al.

(10) Patent No.: US 11,029,384 B2
(45) Date of Patent: Jun. 8, 2021

(54) SYSTEM AND METHOD FOR DETECTING FAKE INFORMATION ABOUT VEHICLE LOCATION

(71) Applicants: Hyundai Motor Company, Seoul (KR); Kia Motors Corporation, Seoul (KR); Korea University Research Business Foundation, Seoul (KR)

(72) Inventors: Jong Rok Park, Seoul (KR); Dong Gyu Noh, Dongducheon-si (KR); Su Lyun Sung, Seoul (KR); Dae Sung Hwang, Hwaseong-si (KR); Hahk Rel Noh, Bucheon-si (KR); Cho Rong Ryu, Incheon (KR); Tae Jun Lee, Gwangmyeong-si (KR); Hyo Gon Kim, Seoul (KR); In Seon An, Seoul (KR); Yong Tae Park, Uijeongbu-si (KR); Tae Ho Kim, Goyang-si (KR)

(73) Assignees: Hyundai Motor Company, Seoul (KR); Kia Motors Corporation, Seoul (KR); Korea University Research and Business Foundation, Seoul (KR)

( * ) Notice: Subject to any disclaimer, the term of this patent is extended or adjusted under 35 U.S.C. 154(b) by 501 days.

(21) Appl. No.: 15/995,391

(22) Filed: Jun. 1, 2018

(65) Prior Publication Data
US 2019/0187234 A1  Jun. 20, 2019

(30) Foreign Application Priority Data
Dec. 14, 2017  (KR) ........................ 10-2017-0172187

(51) Int. Cl.
*G01S 3/04* (2006.01)
*G01S 3/02* (2006.01)
(Continued)

(52) U.S. Cl.
CPC .............. *G01S 3/043* (2013.01); *G01S 3/023* (2013.01); *G01S 3/46* (2013.01); *G01S 5/0045* (2013.01);
(Continued)

(58) Field of Classification Search
None
See application file for complete search history.

(56) References Cited

U.S. PATENT DOCUMENTS

| 2014/0350792 A1* | 11/2014 | Schrabler | G08G 1/165 |
| | | | 701/41 |
| 2017/0307749 A1* | 10/2017 | Shimizu | G08G 1/165 |
| 2019/0068582 A1* | 2/2019 | Kim | G07C 5/008 |

FOREIGN PATENT DOCUMENTS

KR  2011-0065300 A  6/2011

* cited by examiner

*Primary Examiner* — Whitney Moore
(74) *Attorney, Agent, or Firm* — Morgan, Lewis & Bockius LLP

(57) ABSTRACT

A system for detecting fake information about a vehicle location may include a radio signal receiver configured to receive a radio signal from a communication system; a message receiver configured to receive the radio signal to generate a message and determine the message to generate information about a location of the communication system; a radio signal incident angle calculator configured to generate a radio signal incident angle; an azimuth calculator configured to generate a location information azimuth angle by use of the information about locations of the communication system and a receiving vehicle, and a fake vehicle generated by the communication system; and a location information fake detector configured to determine whether location information of the fake vehicle is faked by use of a difference value between an angle corresponding to a ref-
(Continued)

erence axis of the location information azimuth angle and the location information azimuth angle.

18 Claims, 3 Drawing Sheets

(51) Int. Cl.
*G01S 3/46* (2006.01)
*G01S 5/00* (2006.01)
*G08G 1/00* (2006.01)
*G07C 5/00* (2006.01)
*G01S 19/21* (2010.01)
*G01S 19/14* (2010.01)

(52) U.S. Cl.
CPC ................ *G08G 1/00* (2013.01); *G01S 19/14* (2013.01); *G01S 19/215* (2013.01); *G07C 5/008* (2013.01)

SYSTEM AND METHOD FOR DETECTING FAKE INFORMATION ABOUT VEHICLE LOCATION

CROSS-REFERENCE TO RELATED APPLICATION

The present application claims priority to Korean Patent Application No. 10-2017-0172187, filed on Dec. 14, 2017, the entire contents of which is incorporated herein for all purposes by this reference.

BACKGROUND OF THE INVENTION

Field of the Invention

The present invention relates to a system and method for detecting fake information related to a vehicle location, and more to a technology of detecting fake information related to a vehicle location by using a radio signal.

Description of Related Art

In general, a plurality of radio transmitters (communication systems) interworking with a traffic signal controller (Local Controller: LC) is disposed on a road or an intersection, and real-time traffic signal information is transmitted to a vehicle through the radio transmitters. A vehicle provided with a radio receiver receives traffic signal information through the radio receiver. The vehicle interprets the traffic information received through the radio receiver and utilizes the traffic information for idling stop, eco-driving, traffic safety services, and the like.

According to the related art, when the radio transmitter or receiver transmits or receives traffic signal information or vehicle location information, data may be faked or falsified by a malicious user, vehicle location information may be faked, or the vehicle location information or traffic signal information may be misused.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing, as a technology of detecting falsification of location information included in a message in a radio signal, a system and method for detecting fake information related to a vehicle location by measuring the reception direction of the radio signal using the directionality of the radio signal received from a communication system and comparing the measured reception signal of the radio signal with the direction based on the fake vehicle location included in the message in the radio signal.

The technical objects of the present invention are not limited to the above-mentioned one, and the other unmentioned technical objects and advantages will become apparent from the following description.

In accordance with one aspect of the present invention, there is provided a system for detecting fake information related to a vehicle location, which may include: a radio signal receiver configured to receive a radio signal from a communication system; a message receiver configured to receive the radio signal from the radio signal receiver to generate a message, wherein the message receiver determines the generated message to generate information related to a location of the communication system; a radio signal incident angle calculator configured to receive the radio signal from the radio signal receiver to generate a radio signal incident angle; an azimuth calculator configured to generate a location information azimuth angle by use of the information related to the location of the communication system, information related to a location of a receiving vehicle, and a fake vehicle generated by the communication system; and a location information fake detector configured to determine whether information related to a location of the fake vehicle is faked by use of a difference value between an angle corresponding to a reference axis of the location information azimuth angle and the location information azimuth angle.

The radio signal receiver may receive the radio signal from the communication system by use of a multi-antenna.

The radio signal receiver may periodically convert an analog signal received from the communication system into a digital signal.

The message receiver may decode the message by use of the radio signal and determine the generated message to generate the information related to the location of the communication system.

The radio signal incident angle calculator may receive the radio signal, extracts a start time of a radio signal set corresponding to a start of the message by use of the radio signal set of a first antenna in the radio signal, extract a signal set to determine an incident angle based on the radio signal set, and generate the radio signal incident angle based on the radio signal set of the first antenna in the extracted signal set.

The azimuth calculator may generate the location information azimuth angle between the receiving vehicle and the fake vehicle based on a traveling direction of the receiving vehicle by use of the information related to the location of the communication system, the information related to the location of a receiving vehicle, and the fake vehicle generated by the communication system.

The information related to the location of the receiving vehicle may be periodically updated by use of an AVN device or a Global Positioning System (GPS) device in a terminal.

The location information fake detector may generate the angle corresponding to the reference axis of the location information azimuth angle based on the radio signal incident angle, and generate the difference value between the angle corresponding to the reference axis of the location information azimuth angle and the location information azimuth angle to determine whether the information related to the location of the fake vehicle is faked.

The location information fake detector may determine that the information related to the location of the fake vehicle is faked when the difference value between the angle corresponding to the reference axis of the location information azimuth angle and the location information azimuth angle is greater than a set angle.

The location information fake detector may determine that information related to a location of the fake vehicle is not faked when the difference value between the angle corresponding to the reference axis of the location information azimuth angle and the location information azimuth angle is smaller than a set angle.

In accordance with another aspect of the present invention, there is provided a method of detecting fake information related to a vehicle location, which may include: receiving a radio signal from a communication system; generating a message by receiving the radio signal from a radio signal receiver; generating information related to a location of the communication system by determining the generated message; generating a radio signal incident angle by receiving the radio signal from the radio signal receiver; generating a location information azimuth angle by use of the information related to the location of the communication system, information related to a location of a receiving vehicle, and a fake vehicle generated by the communication system; and determining whether information related to a location of the fake vehicle is faked by use of a difference value between an angle corresponding to a reference axis of the location information azimuth angle and the location information azimuth angle.

The receiving of the radio signal may include receiving the radio signal from the communication system by use of a multi-antenna.

The receiving of the radio signal may include periodically converting an analog signal received from the communication system into a digital signal.

The generating of the information related to the location of the communication system may include decoding the message by use of the radio signal; and generating the information related to the location of the communication system by determining the generated message to generate.

The generating of the radio signal incident angle may include extracting a start time of a radio signal set corresponding to a start of the message by use of the radio signal set of a first antenna in the radio signal after receiving the radio signal; extracting a signal set to determine an incident angle based on the radio signal set; and generating the radio signal incident angle based on the radio signal set of the first antenna in the extracted signal set.

The generating of the location information azimuth angle may include generating the location information azimuth angle between the receiving vehicle and the fake vehicle based on a traveling direction of the receiving vehicle by use of the information related to the location of the communication system, the information related to the location of a receiving vehicle, and the fake vehicle generated by the communication system.

The information related to the location of the receiving vehicle may be periodically updated by use of an AVN device or a GPS device in a terminal in the generating of the location information azimuth angle.

The determining of whether the information related to the location of the fake vehicle is faked may include generating the angle corresponding to the reference axis of the location information azimuth angle based on the radio signal incident angle; and generating the difference value between the angle corresponding to the reference axis of the location information azimuth angle and the location information azimuth angle to determine whether the information related to the location of the fake vehicle is faked.

The determining of whether the information related to the location of the fake vehicle is faked may include determining that the information related to the location of the fake vehicle is faked when the difference value between the angle corresponding to the reference axis of the location information azimuth angle and the location information azimuth angle is greater than a set angle.

The determining of whether the information related to the location of the fake vehicle is faked may include determining that information related to a location of the fake vehicle is not faked when the difference value between the angle corresponding to the reference axis of the location information azimuth angle and the location information azimuth angle is smaller than a set angle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
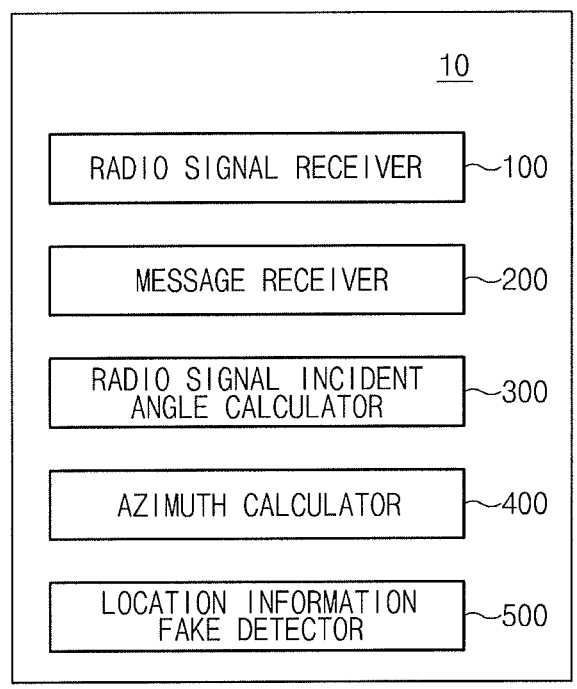
FIG. 1 is a block diagram illustrating a system for detecting fake information related to a vehicle location according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, various exemplary embodiments of the present invention will be described in detail with reference to the accompanying drawings. Throughout the specification, it is noted that the same or like reference numerals denote the same or like components even though they are provided in different drawings. Furthermore, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present invention pertains. The terms defined in the generally used dictionaries should be construed as having the meanings that coincide with the meanings of the contexts of the related technologies, and should not be construed as ideal or excessively formal meanings unless clearly defined in the specification of the present invention.

FIG. 1 is a block diagram illustrating a system for detecting fake information related to a vehicle location according to an exemplary embodiment of the present invention.

Referring to FIG. 1, a system 10 for detecting fake information related to a vehicle location according to an exemplary embodiment of the present invention includes a radio signal receiver 100, a message receiver 200, a radio signal incident angle calculator 300, an azimuth calculator 400, and a location information fake detector 500.

The radio signal receiver 100 receives a radio signal from a communication system (or a transmitting vehicle or a communication antenna) A disposed on a roadside by use of a multi-antenna (array antenna) which may include N antennae.

For example, the communication system A may be a communication device disposed into a vehicle or an infrastructure provided on a roadside, but the exemplary embodiment is not limited thereto.

That is, the communication system A may periodically transmit a basic safety message (BSM), which includes the location, speed and direction of a vehicle, to a surrounding vehicle (e.g., a receiving vehicle) in Wireless Access in Vehicular Environments (WAVE) which is a standard for improving the safety of vehicle traveling.

For example, according to an exemplary embodiment of the present invention, the communication system A may transmit information (which is fake information related to a vehicle location) including a malicious message to a vehicle while transmitting/receiving a radio signal to/from the vehicle. The communication system A provided on a roadside may be hacked to transmit information including an undesired message to a vehicle.

The radio signal receiver 100 periodically converts an analog signal transmitted from the communication system A into a digital signal.

The radio signal receiver 100 may be represented by a digital signal set (a radio signal set) including $S_1, S_2, \ldots, S_N$ as expressed in the following equation. An arbitrary signal set $S_K$ includes a total of T digital signals.

$$S_k = \{s_k^1, s_k^2, \ldots, s_k^T\}, k \in [1,N], T=|S_k| \quad \text{[Equation]}$$

Where $S_K$ denotes an arbitrary signal set, k denotes an antenna number, and T denotes a size of an arbitrary signal set expressed in units of time.

For example, the radio signal receiver 100 may transmit/receive a signal to/from a vehicle, a mobile terminal or a wireless communication base station by use of a radio signal.

More specifically, the radio signal receiver 100 may transmit/receive a signal in various communication protocols. For example, the radio signal receiver 100 may employ a second generation (2G) communication system including Time Division Multiple Access (TDMA), Code Division Multiple Access (CDMA), and the like, a third generation (3G) communication system including Wide Code Division Multiple Access (WCDMA), Code Division Multiple Access 2000 (CDMA 2000), Wireless Broadband (Wibro), Wide Interoperability for Microwave Access (WiMAX), and the like, or a 4G communication system such as Long Term Evolution (LTE), Wireless Broadband Evolution, and the like. Alternatively, the radio signal receiver 100 may employ a 5G communication system.

The 4G communication system utilizes a frequency band of 2 GHz or less, but the 5G communication system utilizes a frequency band of about 28 GHz. However, the frequency band used for the 5G communication system is not limited thereto.

A large-scale antenna system may be employed for the 5G communication system. The large-scale antenna system refers to a system configured for covering an ultra-high frequency band using dozens or more antennae and of simultaneously transmitting/receiving a large amount of data through multi-access. More specifically, the large-scale antenna system may adjust an array of antenna devices to transmit/receive radio waves farther in a certain direction thereof, so that the large-scale antenna system enables large data transmission and expands the usable area of a 5G communication network.

A base station ST is configured for simultaneously transmitting/receiving data to/from many devices through a large-scale antenna system. Furthermore, the large-scale antenna system may minimize the radio wave radiated in a direction other than the direction in which the radio wave is transmitted so that noise is reduced, improving the transmission quality and reducing the amount of power.

Furthermore, unlike the conventional system of modulating a transmission signal in Orthogonal Frequency Division Multiplexing (OFDM), the 5G communication system transmits a radio signal modulated in Non-Orthogonal Multiplexing Access (NOMA), so that more many devices may be multi-accessible and large data may be transmitted/received at the same time. For example, the 5G communication system may provide a transmission speed of up to 1 Gbps. The 5G communication system may support immersive communication requiring large-capacity transmission, such as Ultra-HD (UHD), 3D, hologram, and the like. Thus, a user may transmit/receive an ultra-high-amount of data which is more sophisticated and immersive at a higher speed through the 5G communication system.

Furthermore, the 5G communication system may enable real-time processing at the maximum response speed of 1 ms or less. Thus, the 5G communication system may support a real-time service that responds before the user recognizes the service. For example, a vehicle may receive detector information from various devices even while travelling and process it in real time, so that various remote controls are provided as well as an autonomous system. Furthermore, the vehicle may process detector information from surrounding vehicles existing near the vehicle through the 5G communication system in real time, so that it is possible to provide the possibility of collision and traffic situation information generated on the traveling route to the user in real time.

The message receiver 200 decodes a message using a digital signal set (radio signal set) collected from the radio signal receiver 100. For example, the message may include a message whose location information has been faked, from the communication system A.

For example, the message receiver 200 may include an algorithm for decoding a received digital signal set (radio signal set), and may be provided with a module or circuit formed in a form of an H/W-based A'SSY PCB or System-on-Chip (SoC).

For example, the message receiver 200 may analyze the collected digital signal set (radio signal set) to generate a message in units of bits or bytes.

The message receiver 200 processes the generated message in units of bits or bytes to generate information including information related to a location (LTX), a speed and a direction of the communication system A.

The radio signal incident angle calculator 300 extracts a start time t of a digital signal set (radio signal set) corresponding to the start of a message by use of a digital signal set $S_1$ of an antenna (e.g., the first antenna) in digital signal sets (radio signal set) including $S_1$, $S_2$ to $S_n$ collected through the radio signal receiver 100.

For example, the radio signal incident angle calculator 300 may determine whether a digital signal set (radio signal set) corresponding to the start of a message by use of a digital signal set $S_1$ of an antenna (e.g., the first antenna) in digital signal sets (wireless signal sets).

The radio signal incident angle calculator 300 extracts a signal set X by which an incident angle is determined from the collected digital signal sets (radio signal sets) as the following equation. In the instant case, the incident angle is an angle determined from a coordinate indicating a direction of a vehicle (or an object) from a digital signal set (radio signal set).

$$X_k = \{s_k^t, \ldots, s_k^{t+t_d-1}\}, k \in [1,N], t_d = |X_k| \quad \text{[Equation]}$$

Where $X_K$ denotes an arbitrary signal set (signal set collected by one antenna for a time period of t to $t_d$), k denotes an antenna number, t denotes a start time of a digital signal set, and $t_d$ denotes a size of an arbitrary signal set collected for a predetermined time period.

The radio signal incident angle calculator 300 determines the radio signal incident angle $a_1$ based on the digital signal set $S_1$ of the first antenna by use of the extracted signal set X. For example, the incident angle $a_1$ of the radio signal may be an angle of a radio signal between the communication system A and the receiving vehicle B.

The azimuth calculator 400 determines a location information azimuth angle $a_2$ between the receiving vehicle B and the fake vehicle C based on the traveling direction of the receiving vehicle B by use of the location information $L_{TX}$ of the communication system A extracted from the message receiver 200, the location information $L_{RX}$ updated periodically by the receiving vehicle B, and the fake vehicle C generated by the communication system A. In the instant case, the fake vehicle C may be a non-existent vehicle or a ghost vehicle.

For example, the location information angle $a_2$ may be an angle of a radio signal between the receiving vehicle B and the fake vehicle C. That is, the location information azimuth angle $a_2$ may be an angle of a radio signal between a reference axis in the traveling direction of the receiving vehicle B and the fake vehicle C.

For example, the location information $L_{RX}$ updated periodically by the receiving vehicle B may be obtained by use of a GPS device in an Audio, Video and Navigation (AVN) device and a terminal of the receiving vehicle B.

The location information fake detector 500 determines an angle $a_1$' corresponding to the reference axis of the azimuth angle $a_2$ determined by the azimuth calculator 400 based on the incident angle $a_1$ of the radio signal determined by the radio signal incident angle calculator 300. In the instant case, the location information fake detector 500 may determine a difference value $a_{diff}$ between the angle $a_1$' corresponding to the reference axis of the location information azimuth angle $a_2$ and the location information azimuth angle $a_2$.

When the difference value $a_{diff}$ between the angle $a_1$' corresponding to the reference axis of the location information azimuth angle $a_2$ and the location information azimuth angle $a_2$ is greater than a predetermined angle (reference confidence angle) δ, the location information fake detector 500 determines that the location information $L_{TX}$ of the fake vehicle C is faked and does not use the message transmitted from the communication system A.

When the difference value $a_{diff}$ between the angle $a_1$' corresponding to the reference axis of the location information azimuth angle $a_2$ and the location information azimuth angle $a_2$ is smaller than a predetermined angle (reference confidence angle) δ, the location information fake detector 500 determines that the location information $L_{TX}$ of the fake vehicle C is not faked and may use the message transmitted from the communication system A.

For example, when the reference axis in the traveling direction of the receiving vehicle B is 0 degrees, the location information fake detector 500 may determine that the angle $a_1$' corresponding to the reference axis of the location information azimuth angle $a_2$ is +45 degrees, the location information azimuth angle $a_2$ is −30 degrees, the difference value $a_{diff}$ between the angle $a_1$' corresponding to the reference axis of the location information azimuth angle $a_2$ and the location information azimuth angle $a_2$ is 75 degrees. When the predetermined angle (reference confidence angle) δ is set in the range 1 degrees to 5 degrees, the location information fake detector 500 may compare the difference value $a_{diff}$ with the predetermined angle (reference confidence angle) δ to determine whether the location information $L_{TX}$ of the fake vehicle is faked.

Figure 2:
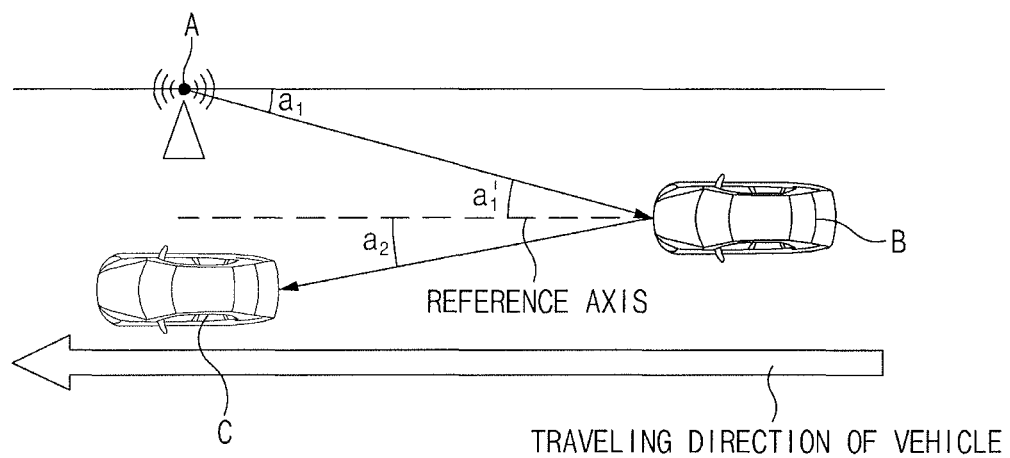
FIG. 2 is a view for explaining a location information fake detector according to an exemplary embodiment of the present invention.

FIG. 2 is a view for explaining a location information fake detector according to an exemplary embodiment of the present invention.

Referring to FIG. 2, the location information fake detector 500 determines the angle $a_1$' corresponding to the reference axis of the azimuth angle $a_2$ determined by the azimuth calculator 400 based on the incident angle $a_1$ of the radio signal determined by the radio signal incident angle calculator 300. In the instant case, the location information fake detector 500 may determine the difference value $a_{diff}$ between the angle $a_1$' and the location information azimuth angle $a_2$.

For example, the incident angle $a_1$ of the radio signal may be the angle of the radio signal between the communication system A and the receiving vehicle B, and the location information azimuth angle $a_2$ may be the angle of the radio signal between the receiving vehicle B and the fake vehicle C. That is, the location information azimuth angle $a_2$ may be an angle of a radio signal between a reference axis in the traveling direction of the receiving vehicle B and the fake vehicle C.

For example, when the difference value $a_{diff}$ between the angle $a_1$' and the location information azimuth angle $a_2$ is greater than a predetermined angle (reference confidence angle) δ, the location information fake detector 500 determines that the location information $L_{TX}$ of the fake vehicle C is faked and does not use the message transmitted from the communication system A.

For example, when the difference value $a_{diff}$ between the angle $a_1$' and the location information azimuth angle $a_2$ is smaller than the predetermined angle (reference confidence angle) δ, the location information fake detector 500 determines that the location information $L_{TX}$ of the fake vehicle C is not faked and may use the message transmitted from the communication system A.

Figure 3:
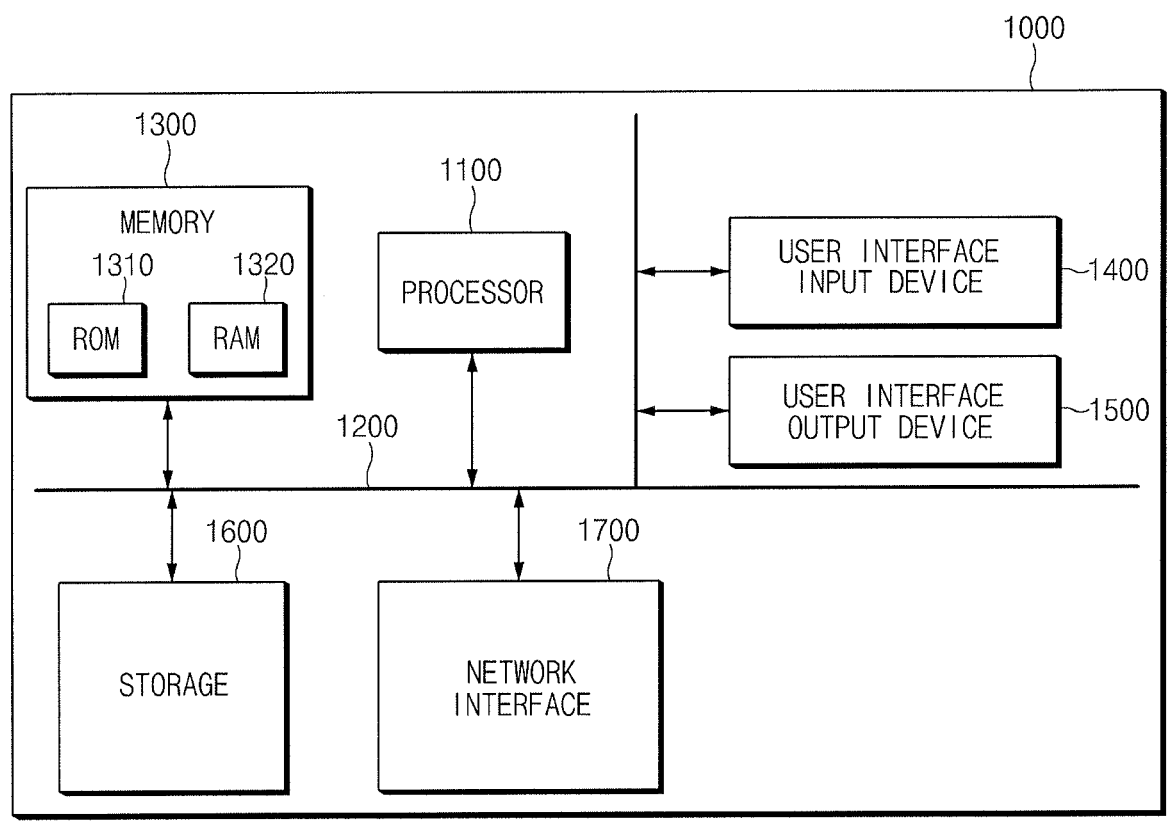
FIG. 3 is a block diagram illustrating a computing system for executing a method of detecting fake information related to a vehicle location according to an exemplary embodiment of the present invention.

FIG. 3 is a block diagram illustrating a computing system for executing a method of detecting fake information related to a vehicle location according to an exemplary embodiment of the present invention.

Referring to FIG. 3, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the processes of the method or algorithm described in relation to the exemplary embodiments of the present invention may be implemented directly by hardware executed by the processor 1100, a software module, or a combination thereof. The software module may reside in a storage medium (that is, the memory 1300 and/or the storage 1600) including a RAM memory, a flash memory, a ROM memory, an EPROM memory, an EEPROM memory, a register, a hard disk, a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the system and method for detecting fake information related to a vehicle location, a radio signal having fake information related to a location of a vehicle is detected, so that the stability of vehicle traveling may be improved.

Furthermore, according to the system and method for detecting fake information related to a vehicle location, the malfunction of a front collision warning system in a driving warning system is reduced, so that the reliability of a driver for a vehicle by reducing may be improved.

The above description is a simple exemplification of the technical spirit of the present invention, and the present invention may be variously corrected and modified by those skilled in the art to which the present invention pertains without departing from the essential features of the present invention.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for detecting fake information related to a vehicle location, the system comprising:
   a radio signal receiver configured to receive a radio signal from a communication system;
   a message receiver configured to receive the radio signal from the radio signal receiver to generate a message, wherein the message receiver determines the generated message to generate information related to a location of the communication system;
   a radio signal incident angle calculator configured to receive the radio signal from the radio signal receiver to generate a radio signal incident angle;
   an azimuth calculator configured to generate a location information azimuth angle by use of the information related to the location of the communication system, information related to a location of a receiving vehicle, and information related to a location of a ghost vehicle generated by the communication system; and
   a location information fake detector configured to determine whether information related to the location of the ghost vehicle is faked by use of a difference value between an angle corresponding to a reference axis of the location information azimuth angle and the location information azimuth angle,
   wherein the azimuth calculator generates the location information azimuth angle between the receiving vehicle and the ghost vehicle based on to the reference axis determined by a traveling direction of the receiving vehicle by use of the information related to the location of the communication system, the information related to the location of the receiving vehicle, and the information related to the ghost vehicle, and
   wherein the reference axis of the location information azimuth angle is determined by the traveling direction of the receiving vehicle.

2. The system of claim 1, wherein the radio signal receiver receives the radio signal from the communication system by use of a multi-antenna.

3. The system of claim 1, wherein the radio signal receiver periodically converts an analog signal received from the communication system into a digital signal.

4. The system of claim 1, wherein the message receiver decodes the message by use of the radio signal and is configured to determine the generated message to generate the information related to the location of the communication system.

5. The system of claim 1, wherein the radio signal incident angle calculator receives the radio signal, extracts a start time of a radio signal set corresponding to a start of the message by use of the radio signal set of an antenna in the radio signal, extracts a signal set to determine an incident angle based on the radio signal set, and generates the radio signal incident angle based on the radio signal set of the antenna in the extracted signal set.

6. The system of claim 1, wherein the information related to the location of the receiving vehicle is periodically updated by use of an Audio, Video and Navigation (AVN) device or a Global Positioning System (GPS) device in a terminal.

7. The system of claim 1, wherein the location information fake detector generates the angle corresponding to the reference axis of the location information azimuth angle based on the radio signal incident angle, and generates the difference value between the angle corresponding to the reference axis of the location information azimuth angle and the location information azimuth angle to determine whether the information related to the location of the ghost vehicle is faked.

8. The system of claim 7, wherein the location information fake detector is configured to determine that the information related to the location of the ghost vehicle is faked when the difference value between the angle corresponding to the reference axis of the location information azimuth angle and the location information azimuth angle is greater than a set angle.

9. The system of claim 1, wherein the location information fake detector is configured to determine that the information related to the location of the ghost vehicle is not faked when the difference value between the angle corresponding to the reference axis of the location information azimuth angle and the location information azimuth angle is smaller than a set angle.

10. A method of detecting fake information related to a vehicle location, the method comprising:
receiving a radio signal from a communication system;
generating a message by receiving the radio signal from a radio signal receiver;
generating information related to a location of the communication system by determining the generated message;
generating a radio signal incident angle by receiving the radio signal from the radio signal receiver;
generating a location information azimuth angle by use of the information related to the location of the communication system, information related to a location of a receiving vehicle, and information related to a location of a ghost vehicle generated by the communication system; and
determining whether the information related to the location of the ghost vehicle is faked by use of a difference value between an angle corresponding to a reference axis of the location information azimuth angle and the location information azimuth angle,
wherein the generating of the location information azimuth angle includes:
generating the location information azimuth angle between the receiving vehicle and the ghost vehicle based on the reference axis determined by a traveling direction of the receiving vehicle by use of the information related to the location of the communication system, the information related to the location of the receiving vehicle, and the information related to the ghost vehicle,
wherein the reference axis of the location information azimuth angle is determined by the traveling direction of the receiving vehicle.

11. The method of claim 10, wherein the receiving of the radio signal includes:
receiving the radio signal from the communication system by use of a multi-antenna.

12. The method of claim 10, wherein the receiving of the radio signal includes:
periodically converting an analog signal received from the communication system into a digital signal.

13. The method of claim 10, wherein the generating of the information related to the location of the communication system includes:
decoding the message by use of the radio signal; and
generating the information related to the location of the communication system by determining the generated message.

14. The method of claim 10, wherein the generating of the radio signal incident angle includes:
extracting a start time of a radio signal set corresponding to a start of the message by use of the radio signal set of antenna in the radio signal after receiving the radio signal;
extracting a signal set to determine an incident angle based on the radio signal set; and
generating the radio signal incident angle based on the radio signal set of antenna in the extracted signal set.

15. The method of claim 10, wherein the information related to the location of the receiving vehicle is periodically updated by use of an Audio, Video and Navigation (AVN) device or a Global Positioning System (GPS) device in a terminal in the generating of the location information azimuth angle.

16. The method of claim 10, wherein the determining of whether the information related to the location of the ghost vehicle is faked includes:
generating the angle corresponding to the reference axis of the location information azimuth angle based on the radio signal incident angle; and
generating the difference value between the angle corresponding to the reference axis of the location information azimuth angle and the location information azimuth angle to determine whether the information related to the location of the ghost vehicle is faked.

17. The method of claim 16, wherein the determining of whether the information related to the location of the ghost vehicle is faked includes:
determining that the information related to the location of the ghost vehicle is faked when the difference value between the angle corresponding to the reference axis of the location information azimuth angle and the location information azimuth angle is greater than a set angle.

18. The method of claim 10, wherein the determining of whether the information related to the location of the ghost vehicle is faked includes:
determining that information related to the location of the ghost vehicle is not faked when the difference value between the angle corresponding to the reference axis of the location information azimuth angle and the location information azimuth angle is smaller than a set angle.

* * * * *